US010595273B2

(12) United States Patent
Wang et al.

(10) Patent No.: US 10,595,273 B2
(45) Date of Patent: *Mar. 17, 2020

(54) SYSTEMS AND METHODS FOR LOCALIZED DEVICE WAKEUP USING BLUETOOTH LOW ENERGY COMMUNICATIONS

(71) Applicant: GOOGLE LLC, Mountain View, CA (US)

(72) Inventors: Liang-Yun Wang, San Jose, CA (US); Prashanth Ramachandran, Foster City, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/149,710

(22) Filed: Oct. 2, 2018

(65) Prior Publication Data

US 2019/0037497 A1 Jan. 31, 2019

Related U.S. Application Data

(63) Continuation of application No. 15/075,797, filed on Mar. 21, 2016, now Pat. No. 10,111,172.

(60) Provisional application No. 62/136,135, filed on Mar. 20, 2015.

(51) Int. Cl.
*H04W 52/02* (2009.01)
*H04W 4/80* (2018.01)

(52) U.S. Cl.
CPC ......... *H04W 52/0229* (2013.01); *H04W 4/80* (2018.02); *H04W 52/0238* (2013.01); *Y02D 70/00* (2018.01); *Y02D 70/144* (2018.01)

(58) Field of Classification Search
CPC ......... H04W 52/0229; H04W 52/0238; H04W 4/80; Y02D 70/144; Y02D 70/00
See application file for complete search history.

(56) References Cited

U.S. PATENT DOCUMENTS

| 9,958,948 | B2 | 5/2018 | Tannenbaum et al. |
| 10,228,903 | B2 * | 3/2019 | Kang ...................... G06F 3/167 |
| 2015/0012761 | A1 | 1/2015 | Li et al. |
| 2015/0099467 | A1 | 4/2015 | Kang |
| 2015/0166075 | A1 | 6/2015 | Nam |
| 2015/0371026 | A1 * | 12/2015 | Gnanasekaran ........ G06F 21/35 726/7 |

(Continued)

*Primary Examiner* — Min Jung
(74) *Attorney, Agent, or Firm* — Colby Nipper PLLC (57) ABSTRACT

Systems and methods for activating select devices are described herein. More particularly, this specification relates to using structure specific service IDs (SSSIDs) when two devices that are part of a common ecosystem are deciding whether to establish a connection according to a Bluetooth protocol. The SSSID can be a unique identifier that can be included in packets that are transmitted in accordance with the standards defining the Bluetooth Low Energy (BLE) protocol. The SSSIDs can be generated and provided to select devices such that only the select devices that are in possession of the SSSID are able to communicate with each other. This advantageously eliminates spurious activation of unintended recipient devices by enabling them to ignore the packet if the SSSID is not recognized, thereby enabling the unintended recipient device to remain in a low power sleepy state.

13 Claims, 6 Drawing Sheets

(56) References Cited

U.S. PATENT DOCUMENTS

| | | | |
|---|---|---|---|
| 2016/0127996 A1* | 5/2016 | Patil | H04W 48/16 |
| | | | 370/311 |
| 2016/0174022 A1 | 6/2016 | Nhu | |
| 2016/0346617 A1 | 12/2016 | Srugo et al. | |
| 2017/0013153 A1* | 1/2017 | Shin | H04W 76/10 |
| 2017/0033837 A1 | 2/2017 | McCormack et al. | |
| 2017/0223615 A1* | 8/2017 | Lee | H04W 48/14 |

* cited by examiner

SYSTEMS AND METHODS FOR LOCALIZED DEVICE WAKEUP USING BLUETOOTH LOW ENERGY COMMUNICATIONS

RELATED APPLICATION

This application is a continuation of U.S. patent application Ser. No. 15/075,797, filed Mar. 21, 2015, which claims priority to U.S. Provisional Application No. 62/136,135, filed Mar. 20, 2015, and the disclosure of each is incorporated by reference herein in its entirety.

TECHNICAL FIELD

This patent specification relates to systems and methods for awakening select devices. More particularly, this specification relates to awakening select devices operating according to a Bluetooth protocol.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Bluetooth Low Energy (BLE) is a wireless radio technology, aimed at new, principally low-power and low-latency applications for wireless devices within a short range (up to about 160 feet). BLE networks are particularly well-suited for a wide range of applications and smaller form factor devices in the healthcare, fitness, security and home entertainment industries. As its name implies, BLE is intended for such energy-constrained applications as a sensor or a disposable device, particularly those that transmit relatively little data and do so infrequently. BLE was designed to enable wireless connectivity with small devices running for extended periods of time on, for example, a coin cell battery. While an objective of networks that utilize BLE technologies is robust and secure delivery of information, saving battery power is also a concern.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods for activating select devices are described herein. More particularly, this specification relates to using structure specific service IDs (SSSIDs) when two devices that are part of a common ecosystem are deciding whether to establish a connection according to a Bluetooth protocol. The SSSID can be a unique identifier that can be included in packets that are transmitted in accordance with the Bluetooth Low Energy (BLE) protocol. The SSSIDs can be generated and provided to select devices such that only the select devices that are in possession of the SSSID are able to communicate with each other. This advantageously eliminates spurious activation of unintended recipient devices by enabling them to ignore the packet if the SSSID is not recognized, thereby enabling the unintended recipient device to remain in a low power sleepy state.

In one embodiment, a method for selectively awakening central devices within broadcast range of a peripheral device is provided. The method can be implemented in a central device, and include receiving a SSSID, storing the SSSID in BLE circuitry, receiving a wake packet, and ignoring the wake packet if it does not include a SSSID that matches the SSSID stored in the BLE circuitry.

In another embodiment, a method for selectively awakening a subset of central devices within broadcasting range of a peripheral device is provided. The method can be implemented in a peripheral device and includes receiving a SSSID, storing the SSSID in BLE circuitry, and transmitting a wake packet using the BLE circuitry, the wake packet comprising the SSSID, which enables central devices that receive the wake packet but do not have the SSSID to ignore the wake packet without having to enter into a relatively higher power consuming state.

In yet another embodiment, a method is provided for managing a plurality of accounts, wherein a first account is associated with a first peripheral device and at least one central device, generating a first SSSID based on the first peripheral device, and providing the first SSSID to the first peripheral device and the at least one central device so that in an event the peripheral device transmits a packet including the SSSID, any central device that has not been provided with the SSSID ignores the packet Various refinements of the features noted above may be used in relation to various aspects of the present disclosure. Further features may also be incorporated in these various aspects as well. These refinements and additional features may be used individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

A further understanding of the nature and advantages of the embodiments discussed herein may be realized by reference to the remaining portions of the specification and the drawings.

DETAILED DESCRIPTION OF THE DISCLOSURE

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

In some wireless networks, wireless devices set up connections with each other to facilitate data transfer. This disclosure focuses on BLE networks, but the scope of the disclosure and the claims applies to other network types as well. In general, a BLE device may operate in different modes depending on required functionality. The main modes of operation include the advertising mode, the scanning mode, central device mode, and peripheral device mode. In advertising mode, the BLE device periodically transmits advertising packets and may respond with more information upon request from other devices. In the scanning mode, a BLE device listens for and receives advertising packets transmitted by other devices and may request additional information from the originator of an advertising packet. A central device may passively scan or actively scan. A peripheral device can connect to a single central, but a central may connect to multiple peripheral devices simultaneously.

To establish a connection, a first BLE device transmits an advertising packet. A second BLE device responds to the advertising packet and may request additional information. Embodiments discussed herein provide the BLE with additional information that enables it to selectively ignore the advertising packet and not respond. If additional information is requested, the first device transmits the requested information. The connection can then be established with the first device being the peripheral device and the second device being the central device. In this disclosure, references to "peripheral device" refer to the BLE device that sends out the advertising packets, and the "central device" is the BLE device that receives and responds to the advertising packets.

Figure 1:
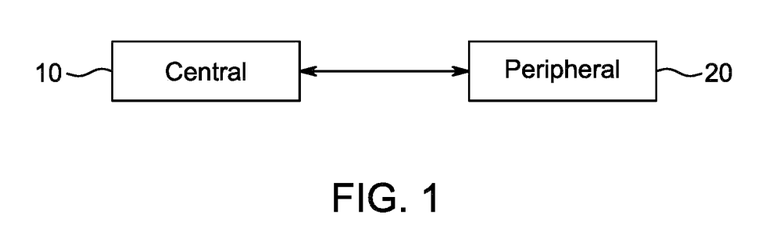
FIG. 1 shows two wireless devices, according to an embodiment.

FIG. 1 shows two wireless devices 10 and 20. Wireless device 10 is a central device and wireless device 20 is a peripheral device. As noted above, to establish a connection between the central device 10 and peripheral device 20, peripheral device 20 transmits an advertising packet which, if received by central 10, indicates the presence of peripheral device 20 to central device 10. Central device 10 may respond with a scan request (SCAN_REQ) packet. Peripheral device 20 responds to the SCAN_REQ with a scan response (SCAN_RSP) packet to provide additional data if necessary before establishing the connection. Central device 10 and peripheral device 20 thus engage in information exchange before establishing a connection. By way of example, central device 10 may be a line powered device or a device with substantial power reserves, and peripheral device 20 may be a battery powered device with limited power reserves. As one specific example, central device 10 may be a user's personal smartphone, and peripheral device 20 may be a hazard detection system (e.g., smoke detector). As another a specific example, central device 10 may be a locking mechanism of a door that can control access to a home, and peripheral device 20 may be a portable fob that a user can use to gain access to the home via central device 10. That is, when a user is within close proximity of the home, peripheral device 20 may alert its presence to central device 10, which may attempt to connect to device 20. After a connection is made, the user may lock or unlock the door using the portable fob.

Figure 2:
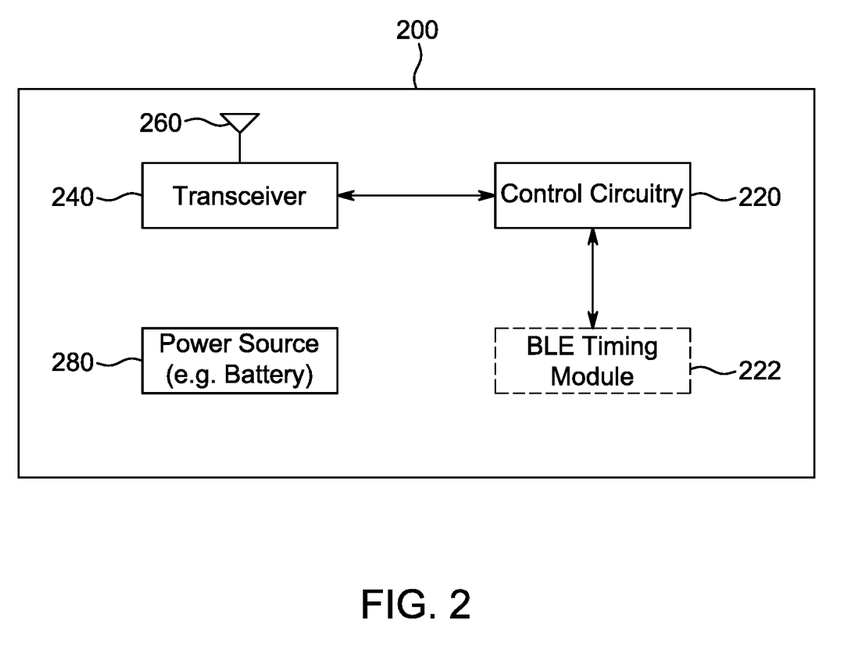
FIG. 2 illustrates a block diagram of a peripheral device, according to an embodiment.

FIG. 2 illustrates a block diagram of peripheral device 200. As shown, device 200 includes control circuitry 220, BLE timing module 222, transceiver 240, antenna 260, and power source 280. Power source 280 provides electrical power to circuitry 220, module 222, and transceiver 240. Transceiver 240 can accept signals from circuitry 220 to transmit wirelessly via antenna 260. Similarly, wireless signals received by antenna 260 are provided by transceiver 240 to controller 220 for processing. Transceiver 240 may be capable of bi-directional data communications with another wireless device such as central device 10. Control circuitry 220 may include a processor that executes software. Control circuitry 220 may access BLE timing module 222 to adjust an advertising frequency according to various embodiments. Control circuitry 220 can perform some or all of the functionality described herein as attributed to peripheral device 200. The architecture depicted in FIG. 2 may be used as well to implement central device 10.

Additional components that are not shown in FIG. 2 may be included as part of device 200. For example, device 200 can include one or more additional processors, memory, additional wireless communication circuits (e.g., 801.11 and 802.15.4), user interfaces (e.g., buttons, display, etc.).

In the BLE protocol, channels 37, 38, and 39 are dedicated for use in transmitting advertising packets and the associated responses. Central device 10 can listen on each advertising channel for an advertising packet being transmitted by peripheral device 20. Central device 10 can passively listen or actively listen for advertising packets. During passive listening, central device 10 may not transmit scan requests responsive to a received advertising packet. During active scanning, however, central device 10 may transmit scan requests responsive to a received advertising packet.

Peripheral device 20 may transmit advertising packets according to an advertising frequency. The advertising frequency can characterized as having an advertising period. Thus, device 20 can transmit an advertising packet at the end of each advertising period. Within each period, device 20 can listen for wireless packets during a listen window. The listen window may have a start point that coincides with the start of a period, and an end point that defines the end of the listen window. The listen window may be a fixed parameter set, for example, by a Bluetooth Low Energy (BLE) protocol. The listen window may define the only time during an advertising period during which device 20 can listen for wireless packets. For example, device 20 may listen for scan request packets or connection request packets being transmitted by central device 10 during the listen window.

The advertising packet can include data arranged in different data fields. The data field can include device name, legacy services provided by the peripheral, manufacturer data, service-specific data, and other fields. The service provided by the peripheral may be represented by a legacy service ID. In conventional BLE usage scenarios, a first BLE device may transmit advertisement packets that are picked up by any number of second BLE devices that are in range of the first BLE device. The second BLE devices can scan for the advertisement packets and react when it recognizes data (e.g., legacy service ID) contained in one of those packets. When a packet is recognized, the device may wake up, thereby increasing the power consumption of that device, by requesting additional information from the first BLE device and/or by triggering activation of a higher level software program (e.g., an application). A potential problem that may exist is that the same advertising packet can wake up every single second BLE device in BLE range of the first device, regardless of who owns the second device. This can result in unintended consequence of activating unintended recipients of the first device's advertisement packet.

Unintended recipient BLE devices may be running common software programs that enable both intended and unintended recipients to recognize data (e.g., legacy service ID) being transmitted by the first BLE device. Moreover, the devices that broadcast wake packets may be part of the same ecosystem as the recipient devices. As a result, some data such as the service ID may be common for all the BLE devices operating within the same ecosystem. Use of the common service ID can be a recipe for causing activation of central devices that should not be activated. An example of unintended activation of a central device is now discussed in connection with FIG. 3.

Figure 3:
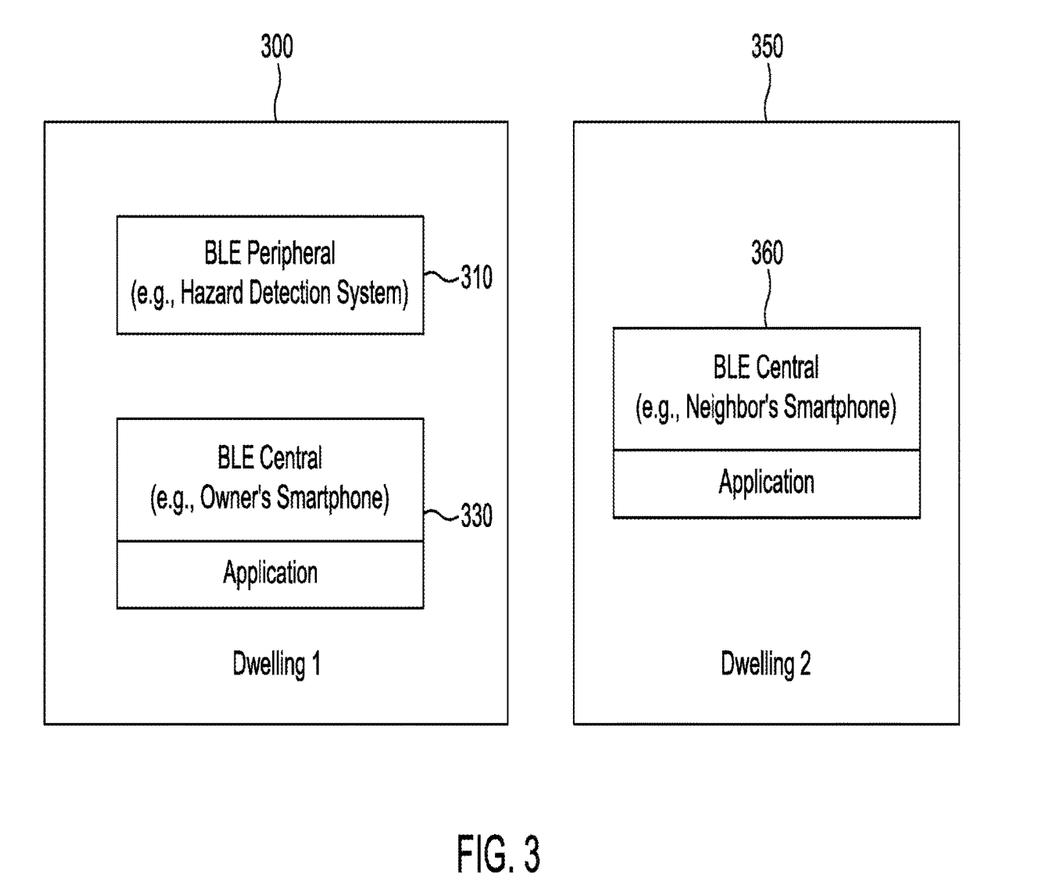
FIG. 3 shows an illustrative block diagram of dwellings that can include peripheral devices and central devices, according to an embodiment.

FIG. 3 shows an illustrative block diagram of dwellings 300 and 350, one of which can include peripheral device 310 and central device 330, and the other can include central device 360. Devices 310, 330, and 360 may all be operating in the same ecosystem and thus each have BLE circuitry that is pre-programmed with a common service ID or other common identifier. In addition, central devices 330 and 360 may have the same application software. When peripheral device 310 transmits a wake packet, both central devices 330 and 360 may receive that wake packet, even though central device 330 is the only intended recipient of the packet. When central device 360 receives the packet, its BLE circuitry may recognize the legacy service ID accompanying the wake packet and trigger activation of the application. Once the application is running, it may determine that the source of the wake packet is a peripheral device with which it is not associated with (e.g., devices 310 and 360 are registered to different accounts), and then proceed to shut down operation of the application. However, because peripheral device 310 is repeating transmission of the wake packets for a fixed period of time, central device 360 may cycle through activation of the application step, determination step, and closing of the application step each time it receives the wake packet. This creates an unnecessary power drain on central device 360. Embodiments discussed herein eliminate spurious activation of unintended devices by using a structure specific service ID (SSSID) that is known only by devices that are intended to communicate with each other. The wake packets can include one or more SSSIDs. This enables unintended central devices to ignore wake packets that include unknown SSSIDs, thus enabling the unintended central device to remain in a low power sleepy state and not activate the application.

The SSSID is a unique identifier that can be used in accordance with the standards defining the BLE protocol. That is, the SSSID can be used by the BLE circuitry of the peripheral and central devices. For example, a peripheral device may incorporate the SSSID into the wake packets it broadcasts, and a central device may be able to filter out or ignore wake packets that do not have SSSIDs that match any of the SSSIDs it has been "taught" to recognize. The SSSIDs are not common identifiers such as the conventional legacy service ID, but are unique identifiers that are provided to select peripheral and central devices. The unique aspect of the SSSID is derived from its structure specific application. That is, for any given structure (e.g., a peripheral device), a unique SSSID can be generated for that structure and distributed to that structure and any other structures (e.g., central devices) designated as intended communication partners.

Figure 4:
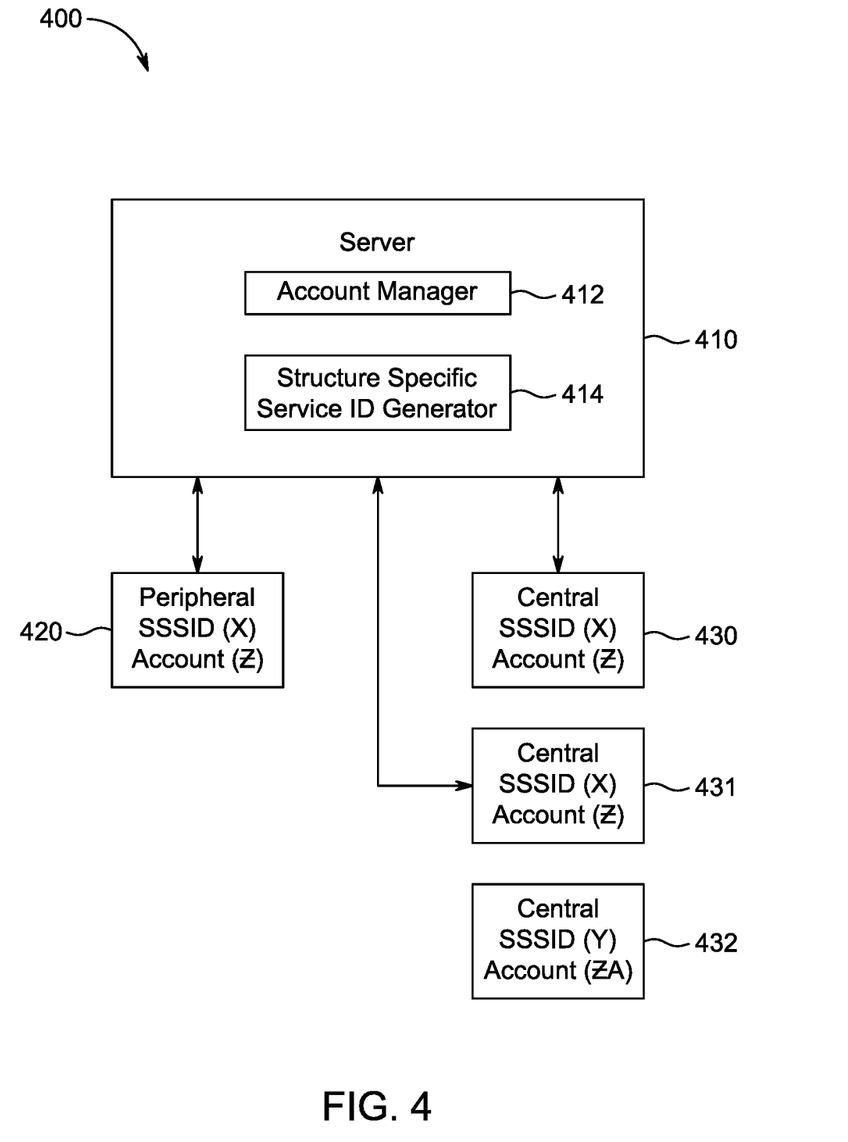
FIG. 4 shows an illustrative block diagram of system for generating and distributing structure specific service IDs, according to an embodiment.

FIG. 4 shows an illustrative block diagram of system 400 for generating and distributing SSSIDs according to an embodiment. System 400 can include server 410, peripheral device 420, and central devices 430-432. It should be understood that additional peripheral devices and central device may form part of system 400, but only a few are shown to avoid overcrowding the FIG. Server 410 may be a remote server that can be accessed by devices 420 and 430-432 via a network such as, for example, the internet. Server 410 may perform many functions, including, but not limited to account management and generation of structure specific service IDs. Account manager 412 may maintain accounts held by users of peripheral and central devices. For example, peripheral device 410 and central devices 430 and 431 may be associated with account Z, and central device 432 may be associated with account ZA. Based on this example, any wake packets transmitted by peripheral device 420 are intended for consumption by central devices 430 and 431, but not device 432.

Structure specific service ID generator 414 may generate SSSIDs for distribution to select peripheral and central devices. Generator 414 may generate a unique SSSID for each peripheral device that is associated with at least one central device. For example, generator 414 may create SSSID(X) for peripheral device 420 and distribute SSSID (X) to peripheral device 420 and central devices 430 and 431. Central device 432 is not provided with SSSID(X), but with SSSID(Y). Devices 420 and 430 and 431 may be provided with SSSID(X) because they are all associated with account(z). Thus, when peripheral device 420 broadcasts a wake packet including SSSID(X), central devices 430 and 431 may recognize that SSSID and take action, whereas, central device 432 may ignore the wake packet since it does not recognize SSSID(X).

Although not shown in FIG. 4, another peripheral device associated with account(x) may be part of system 400. Generator 414 may generate separate unique SSSID for this other peripheral device, labeled SSSID(Z). SSSID(Z) may be provided to this other peripheral and central devices 430 and 431. Thus, when this other peripheral broadcasts a wake packet with SSSID(Z), central devices 430 and 431 may recognize that SSSID and take action, whereas, central device 432 may ignore the wake packet since it does not recognize SSSID(Z).

Multiple different SSSIDs can be generated for each structure, and each structure can store these multitude of SSIDs. For example, in one embodiment, the SSSID generator 414 can create two or more SSSIDS for a peripheral device. If desired, the SSSIDs may be represented by different classes of services. For example, a first SSSID can be represented by a class of urgent services (e.g., smoke, water leak, missing pet, etc.) and a second SSSID can be represented by a class of non-urgent services (e.g., weather, stocks, etc.).

Figure 5:
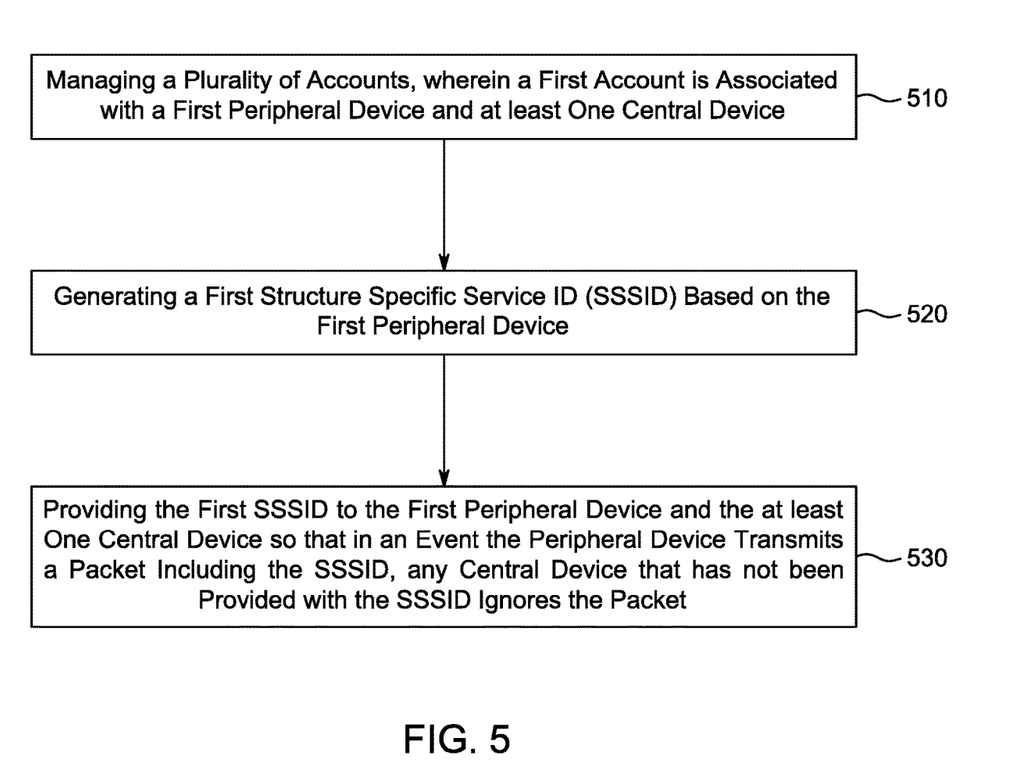
FIG. 5 shows an illustrative flowchart of process that may be implemented by a remote server according to an embodiment.

FIG. 5 shows an illustrative flowchart of process 500 that may be implemented by a remote server according to an embodiment. The remote server may be a proprietary server that interacts with peripheral devices and central devices that are associated with a common ecosystem of devices and services. Starting at step 510, several accounts may be managed, wherein a first account is associated with a first peripheral device and at least one central device. At step 520, a first structure specific service ID (SSSID) based on the first peripheral device may be generated. For example, SSSID generator 414 may generate the first SSSID. At step 530, the first SSSID may be provided to the first peripheral device and the at least one central device so that in an event the peripheral device transmits a packet including the SSSID, any central device that has not been provided with the SSSID ignores the packet. The first SSSID may be provided to the peripheral device and the at least one central device when they perform routine access to the server. When the devices sync with the server, they may receive one or more SSSIDs, as appropriate.

Figure 6:
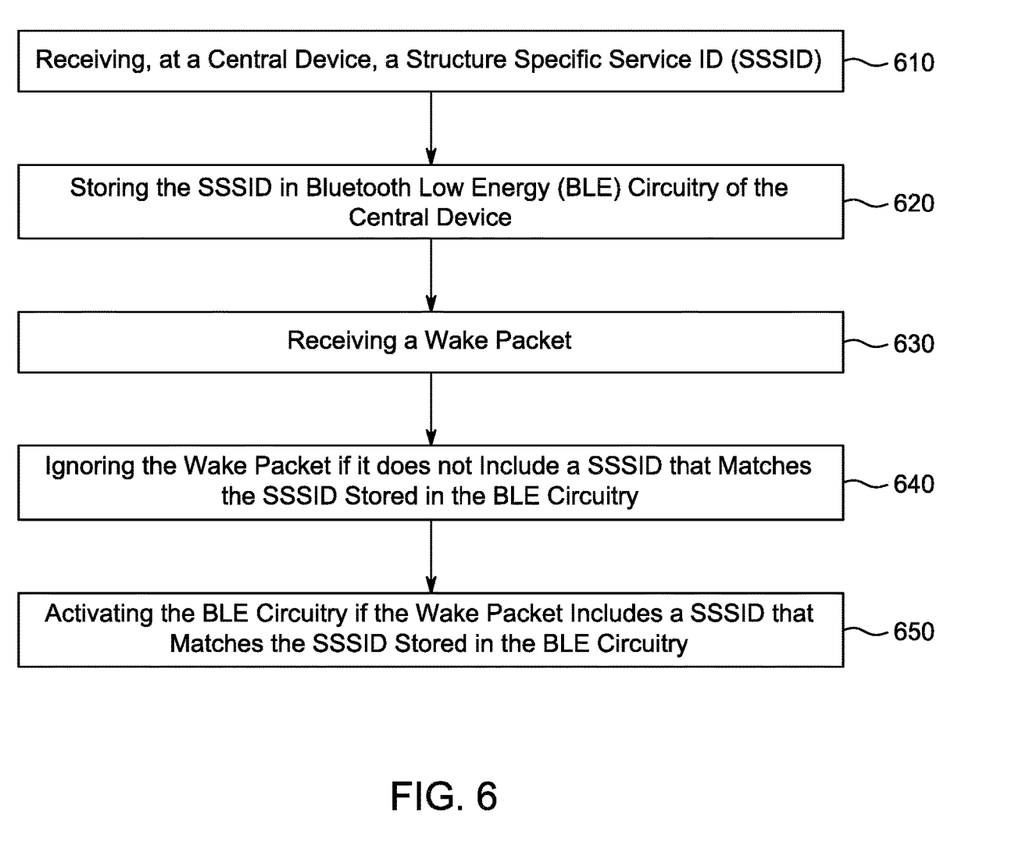
FIG. 6 shows an illustrative flowchart of process that may be implemented by a central device according to an embodiment.

FIG. 6 shows an illustrative flowchart of process 600 that may be implemented by a central device according to an embodiment. Starting at step 610, a structure specific service ID (SSSID) can be received by a central device. The SSSID may be provided by a remote server (e.g., server 410 of FIG. 4). At step 620, the SSSID can be stored in Bluetooth Low Energy (BLE) circuitry of the central device. For example, the SSSID may be stored in a register, buffer, or memory. It is these stored SSSIDs that can dictate whether the central device will act on or ignore a received wake packet. At step 630, a wake packet is received. The wake packet may be transmitted by any one of several potential peripheral devices. If the wake packet does not include a SSSID that matches the SSSID stored in the BLE circuitry, that wake packet may be ignored, as indicated by step 640. However, if the wake packet does include a SSSID that matches the SSSID stored in the BLE circuitry, the central device may activate the BLE circuitry, as indicated by step 650.

Figure 7:
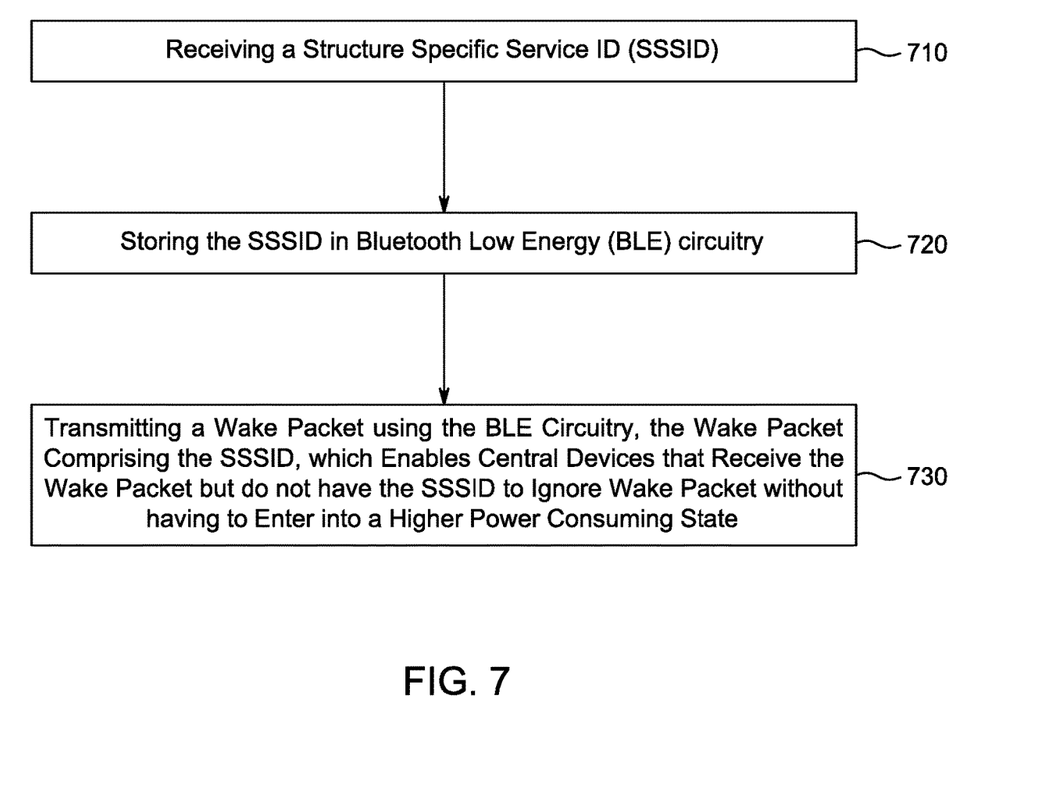
FIG. 7 shows an illustrative flowchart of process that may be implemented by a peripheral device according to an embodiment.

FIG. 7 shows an illustrative flowchart of process 700 that may be implemented by a peripheral device according to an embodiment. Starting at step 710, a structure specific service ID (SSSID) can be received by a peripheral device. The peripheral device may store that SSSID in its BLE circuitry so that it can be incorporated into wake packets, as indicate by step 720. At step 730, the peripheral device can transmit a wake packet using the BLE circuitry. The wake packet includes the SSSID, which enables central devices that receive the wake packet, but do not have the SSSID, to ignore wake packet without having to enter into a relatively higher power consuming state than it would have been in had it not been forced to exit out of its relatively lower power consuming state. Thus, any central devices that receive the wake packet from the peripheral, but do not recognize the SSSID in that wake packet, are not fruitlessly activated. Central devices that recognize the SSSID may have been previously informed of the SSSID during a sync event with a remote server can activate additional circuitry and/or cause an application to run in response to receiving a wake packet containing the SSSID.

It should be appreciated that the steps of FIGS. 5-7 are merely illustrative and that additional steps may be added, steps may be omitted, or the steps may be re-ordered.

An example embodiment is now discussed that takes into account the teachings of the above-described embodiments. Referring to FIG. 3, assume that BLE peripheral device 310 has been provided with a first SSSID and that the central device 330 has been provided with the first SSSID. Further assume that central device 360 is within broadcasting range of peripheral device 310, but it does not have the first SSSID. Further still assume that peripheral device 310 is a hazard detection system such as smoke/CO alarm and that central devices 330 and 360 are media devices capable of running the same application (e.g., a smoke alarm application). Peripheral device 310 may broadcast a wake packet in response to detecting a hazard condition (e.g., smoke) and sound its alarm. Both central devices 330 and 360 may receive the wake packet, but only central device 330 takes action in response to detecting the SSSID in the wake packet, whereas central device 360 ignores wake packet since it did not recognize the SSSID. Upon receipt of the wake packet, central 330 may establish a connection with peripheral device 310 and activate the application. The application may enable a user to send commands directly to peripheral device 310 via the BLE circuitry. In some embodiments, the user may be able to send a "hush" command that can at least temporarily silence the sounding alarm.

Any processes described with respect to FIGS. 1-7, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions that can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A central device operative to communicate with a peripheral device, the central device comprising:
    a transceiver;
    Bluetooth Low Energy (BLE) circuitry; and
    control circuitry coupled to the transceiver and the BLE circuitry, the control circuitry operative to:
        receive a structure specific service ID (SSSID), wherein the central device and the peripheral device are associated with a structure corresponding to the SSSID;
        store the SSSID in the BLE circuitry;
        receive, via the BLE circuitry, a wake packet; and
        ignore the wake packet if it does not include an SSSID that matches the SSSID stored in the BLE circuitry.

2. The central device of claim 1, wherein the control circuitry is operative to activate the BLE circuitry if the wake packet includes an SSSID that matches the SSSID stored in the BLE circuitry.

3. The central device of claim 1, wherein the control circuitry is operative to enable a user to interact with the central device so that the user can cause data to be transmitted from the central device to the peripheral device.

4. The central device of claim 3, wherein the peripheral device is a hazard detection system that is sounding its alarm, and wherein the data transmitted from the central device to the hazard detection system is a command to silence the sounding alarm.

5. The central device of claim 1, wherein the SSSID is a unique identifier that is generated in connection with a particular peripheral device, wherein the SSSID is stored in that particular peripheral and at least one central device that is an intended recipient of a wake packet broadcasted by the particular peripheral.

6. The central device of claim 1, wherein the SSSID is a randomly generated 16 byte number.

7. The central device of claim 1, wherein the central device is a portable media device.

8. A peripheral device operative to communicate with a central device, the peripheral device comprising:
    a transceiver;
    Bluetooth Low Energy (BLE) circuitry; and
    control circuitry coupled to the transceiver and the BLE circuitry, the control circuitry operative to:
        receive a structure specific service ID (SSSID), wherein the central device and the peripheral device are associated with a structure corresponding to the SSSID;
        store the SSSID in the BLE circuitry; and
        transmit a wake packet using the BLE circuitry, the wake packet comprising the SSSID, which enables central devices that receive the wake packet, but do not have the SSSID, to ignore the wake packet without having to enter into a relatively higher power consuming state.

9. The peripheral device of claim 8, wherein the control circuitry is operative to transmit the wake packet in response to a detected hazard event.

10. The peripheral device of claim 8, wherein the control circuitry is operative to transmit the wake packet in response to a detected security event.

11. The peripheral device of claim 8, wherein the SSSID is associated with a peripheral device and at least one central device, and wherein the peripheral device and the least one central device are affiliated with a first account.

12. The peripheral device of claim 8, wherein the SSSID is a unique identifier that is generated in connection with a particular peripheral device, and wherein the SSSID is stored in that particular peripheral and at least one central device that is an intended recipient of a wake packet broadcasted by the particular peripheral.

13. The peripheral device of claim 8, wherein the SSSID is a randomly generated 16 byte number.

* * * * *